United States Patent
Krovats

(10) Patent No.: US 8,316,617 B2
(45) Date of Patent: Nov. 27, 2012

(54) ROOF OBJECT SUPPORT DEVICE

(75) Inventor: Neil Krovats, Winnipeg (CA)

(73) Assignee: Clearline Technologies Inc., Winnipeg, MB (CA)

( * ) Notice: Subject to any disclaimer, the term of this patent is extended or adjusted under 35 U.S.C. 154(b) by 0 days.

(21) Appl. No.: 12/962,208

(22) Filed: Dec. 7, 2010

(65) Prior Publication Data

US 2011/0154771 A1 Jun. 30, 2011

Related U.S. Application Data

(60) Provisional application No. 61/267,279, filed on Dec. 7, 2009.

(51) Int. Cl.
*E04B 1/00* (2006.01)
*E04G 21/00* (2006.01)
*E04G 23/00* (2006.01)

(52) U.S. Cl. ........ 52/746.11; 52/745.21; 52/24; 52/408; 52/698

(58) Field of Classification Search ............... 52/745.21, 52/746.11, 299, 408, 698, 173.3, 24, 27, 52/219; 248/237
See application file for complete search history.

(56) References Cited

U.S. PATENT DOCUMENTS

| | | | |
|---|---|---|---|
| 4,158,276 A * | 6/1979 | Stoneman | 52/219 |
| 4,730,421 A * | 3/1988 | Leeland | 52/58 |
| 5,685,508 A | 11/1997 | Smith | |
| 5,887,831 A * | 3/1999 | Post | 248/49 |
| 6,520,456 B1 | 2/2003 | Neider et al. | |
| 6,526,701 B2 * | 3/2003 | Stearns et al. | 52/24 |
| 6,592,093 B2 | 7/2003 | Valentz | |
| 7,069,698 B2 * | 7/2006 | Nee | 52/24 |
| 7,168,210 B2 | 1/2007 | Krovats | |
| 2005/0241240 A1 * | 11/2005 | Parker | 52/2.17 |
| 2007/0022676 A1 * | 2/2007 | Krovats | 52/167.9 |
| 2009/0291249 A1 * | 11/2009 | Mehta et al. | 428/86 |

* cited by examiner

*Primary Examiner* — Brian Glessner
*Assistant Examiner* — Brian D Mattei
(74) *Attorney, Agent, or Firm* — Ryan W. Dupuis; Kyle R. Satterthwaite; Ade & Company Inc.

(57) ABSTRACT

A roof object is supported on a weatherproofing roof membrane of a building roof structure using a support device including a mounting block and a coupling sheet. The mounting block is a resilient block of material for damping vibrations mechanical roof objects. The coupling sheet is mechanically connected to the mounting block using threaded fasteners which clamp a portion of the coupling sheet to the bottom of the mounting block. The remainder of the coupling sheet spans the bottom side of the block to protect the roof membrane from wear resulting from relative movement between the block and the roof membrane. The coupling sheet is also formed of a bond compatible material with the roof membrane so that the block can be held down onto the roof structure even when the block is not bond compatible with the roof membrane by instead bonding the coupling sheet to the roof membrane.

19 Claims, 3 Drawing Sheets

ROOF OBJECT SUPPORT DEVICE

This application claims the benefit under 35 U.S.C. 119(e) of U.S. provisional application Ser. No. 61/267,279, filed Dec. 7, 2009.

FIELD OF THE INVENTION

The present invention relates to a roof object support device arranged for supporting a roof object on a roof such that the roof object is isolated from the roof by self-dampening elastomeric material, and more particularly the present invention relates to a roof object support device which is suited for adhesive bonding to a roof membrane of the roof.

BACKGROUND

Various service units are found on the roofs of buildings, particularly commercial buildings. These service units will often have pipes and ductwork that snake along the rooftop. Furthermore, roof walkway systems are often present to facilitate access to the service units. These rooftop objects usually require supports to prevent damage to the roof surface.

The simplest support solution is the use of blocks of wood to support an object at intervals along its length. Although this simple support device has a number of drawbacks. A rooftop object being supported often vibrates causing vibrations to be transmitted through the block of wood. The result is excessive noise and movement of the block. It is conceivable that the block could move enough that it no longer supports the object it is intended to. Furthermore, this excessive movement may cause damage to the roof's surface requiring expensive repairs. The blocks could be fastened to the roof but this could cause future leaks if not sealed properly. Furthermore, wood in particular will deteriorate over time due to weathering and could possibly break loose.

U.S. Pat. No. 6,520,456 by Neider et al and U.S. Pat. No. 6,592,093 by Valentz disclose examples of supporting devices for use on a roof top. In each instance, the devices are particularly suited for supporting pipes extending along a roof such that the pipe is spaced above the roof and is permitted some relative movement in relation to the roof. Neither of the devices are suited for holding down a roof supported object with any substantial force. Furthermore, the devices require manufacture with new materials.

U.S. Pat. No. 5,685,508 by Smith discloses an alternative supporting device for a rooftop in which a resilient pad can be secured to a roof top with adhesive. Adhesive bonding to the roof requires the use of new material for formation of the resilient layer of the supporting device in order for effective bonding to the roof top. The remaining construction of the supporting device also requires a rigid member in order to adequately support pipes and the like thereon which limits the vibration absorbing abilities of the block.

U.S. Pat. No. 7,168,210 by Krovats discloses a support block for use on roofs in which the block is uniformly comprised of recycled rubber to maximize vibration dampening properties of the block. Although the use of adhesive for securing the block to the roof is proposed, the recycled rubber is typically not compatible with various roof membranes to which the block can be secured so that it is difficult to effectively and strongly secure the recycled material of the block to the roof membrane.

SUMMARY OF THE INVENTION

According to one aspect of the invention there is provided a method of supporting a roof object on a roof of a building comprising a rigid supporting structure and a roof membrane bonded to an upper surface of the rigid supporting structure so as to be arranged for weatherproofing the supporting structure, the method comprising:

providing a support device comprising a mounting block formed of a material which differs from the roof membrane and a coupling sheet formed of a material which is arranged to be bonded to the roof membrane;

bonding the coupling sheet to the roof membrane;

connecting the mounting block to the coupling sheet using a first mechanical connection; and coupling the roof object to the mounting block using a second mechanical connection.

Use of a coupling sheet which is mechanically fastened to the block permits the block to be formed of any desired material including recycled rubbers and the like, while the coupling sheet at the bottom side can be selected to be most compatible with the roof membrane for adhesive bonding therebetween or for reduced wear of the roof membrane upon which the coupling sheet is engaged. The coupling sheet for example may comprise raw rubber to permit a much stronger bond to the existing roof membrane than can be achieved in prior art configurations while still taking advantage of the self-dampening properties of the recycled rubber forming the block member. Mechanically fastening the block to the coupling sheet also permits a strong hold down force to the roof without requiring fasteners to be pierced through the existing roof membrane so that the integrity of the roof membrane is preserved despite the mechanical fastening of the block member and roof object supported thereon.

Preferably the roof membrane is selected from the group including thermoplastic olefin, ethylene propylene diene monomer rubber, polyvinyl chloride, and modified bituminous and the method includes: i) forming the coupling sheet of a material which is bond compatible with the roof membrane, and ii) bonding the coupling sheet to the roof membrane such that a bond between the coupling sheet and the roof membrane has a bond strength which exceeds 60 pounds per square foot. The bond strength may exceed 225 pounds per square foot or more depending upon the material of the roof membrane and the coupling sheet.

The coupling sheet may be formed such that a peripheral portion of the coupling sheet projects laterally outwardly beyond the mounting block about a full perimeter of the mounting block. In this instance, the peripheral portion of the coupling sheet may be bonded to the roof membrane subsequent to supporting the mounting block on the roof membrane if desired.

Preferably the mechanical connection between the coupling sheet and the mounting block is spaced from a bonded portion of the coupling sheet to the roof membrane to allow some relative movement of the block relative to the coupling sheet as the intermediate portion of the coupling sheet between the mechanical connection and the bonded portion flexes.

The first mechanical connection preferably includes connecting the mounting block to the coupling sheet by frictionally clamping a portion of the coupling sheet using threaded fasteners extending through the coupling sheet and through a portion of the mounting block such that a portion of the coupling sheet is clamped in engagement against a bottom side of the mounting block.

When a recessed portion is formed in a bottom side of the mounting block, preferably the first mechanical connection is located in the recessed portion such that a portion of the coupling sheet which is mechanically coupled to the mounting block is space upwardly from a bonded portion of the coupling sheet which is bonded to the roof membrane.

When the mounting block comprises a resilient, vibration damping material, the method may include clamping a rigid mounting member to the mounting block using threaded fasteners such that the second mechanical connection comprising the roof object being mechanically connected to the rigid mounting member. The threaded fasteners of the first mechanical connection between the coupling sheet and the block may be commonly used to couple the rigid mounting member to the mounting block.

In alternative embodiments, the coupling sheet comprises a membrane having integrally moulded fleece fibres which are exposed on a lower bonding surface and bonding the fleece fibres of the lower bonding surface to the roof membrane.

According to a second aspect of the present invention there is provided a method of supporting a roof object on a roof of a building comprising a rigid supporting structure and a roof membrane spanning an upper surface of the rigid supporting structure so as to be arranged for weatherproofing the supporting structure, the method comprising:

providing a support device comprising a mounting block formed of a material which differs from the roof membrane and a sheet formed of a material which differs from the mounting block;

connecting the sheet to the mounting block using a mechanical connection;

supporting the mounting block on the roof membrane such that the sheet spans a bottom side of the mounting block; and supporting the roof object on the mounting block.

When the roof membrane is selected from the group including thermoplastic olefin, ethylene propylene diene monomer rubber, polyvinyl chloride, and modified bituminous, the sheet is preferably formed of the same material so as to have the same or less hardness than the roof membrane.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
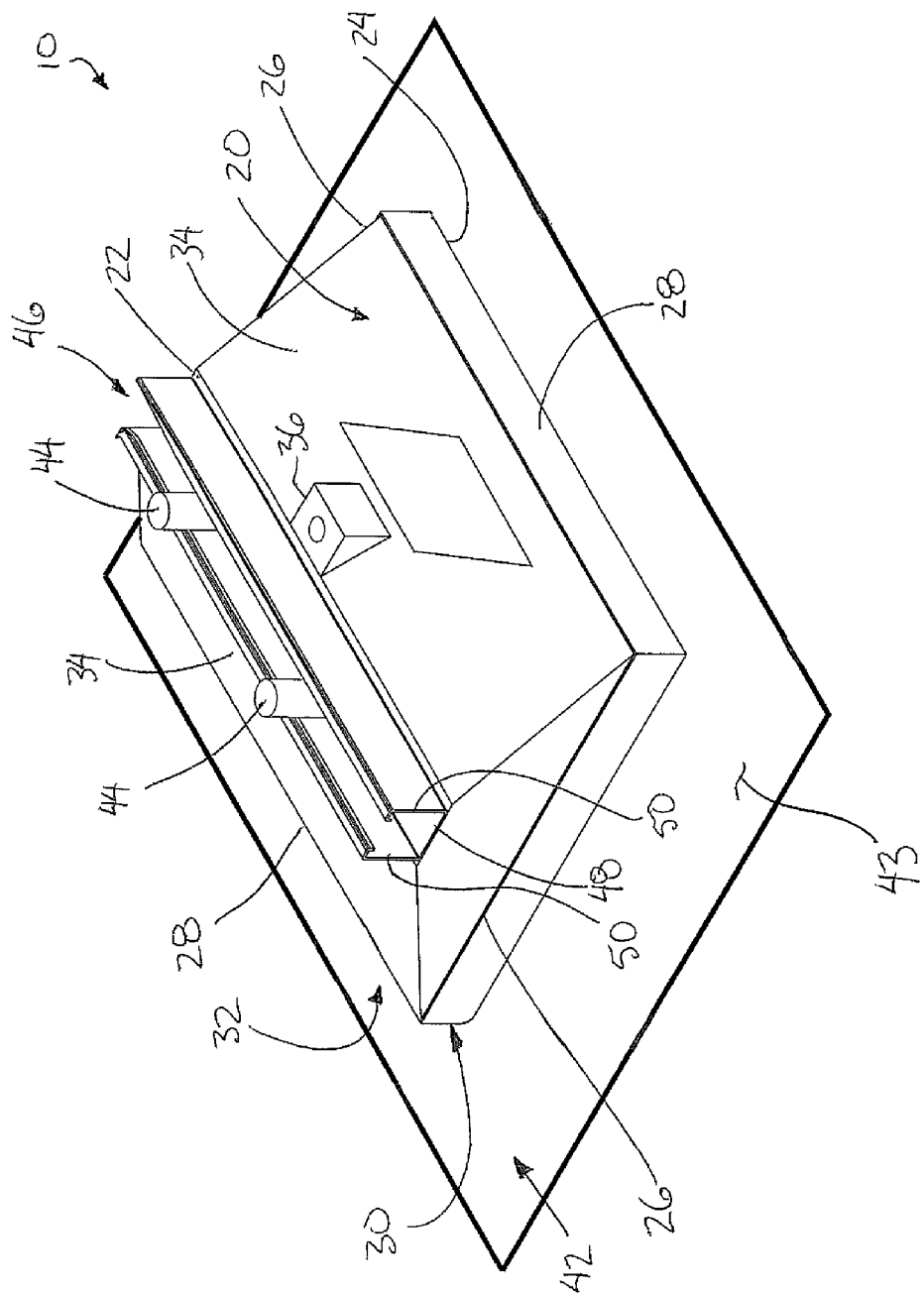
FIG. 1 is a perspective view of the support device.
Figure 2:
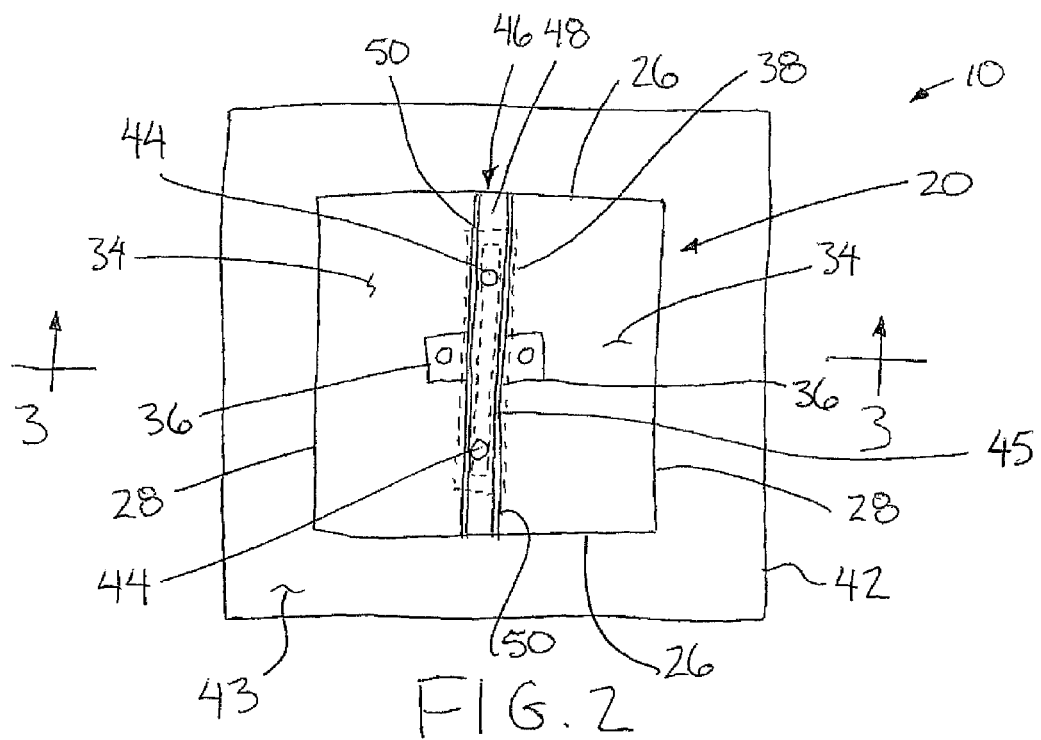
FIG. 2 is a top plan view of the support device.
Figure 3:
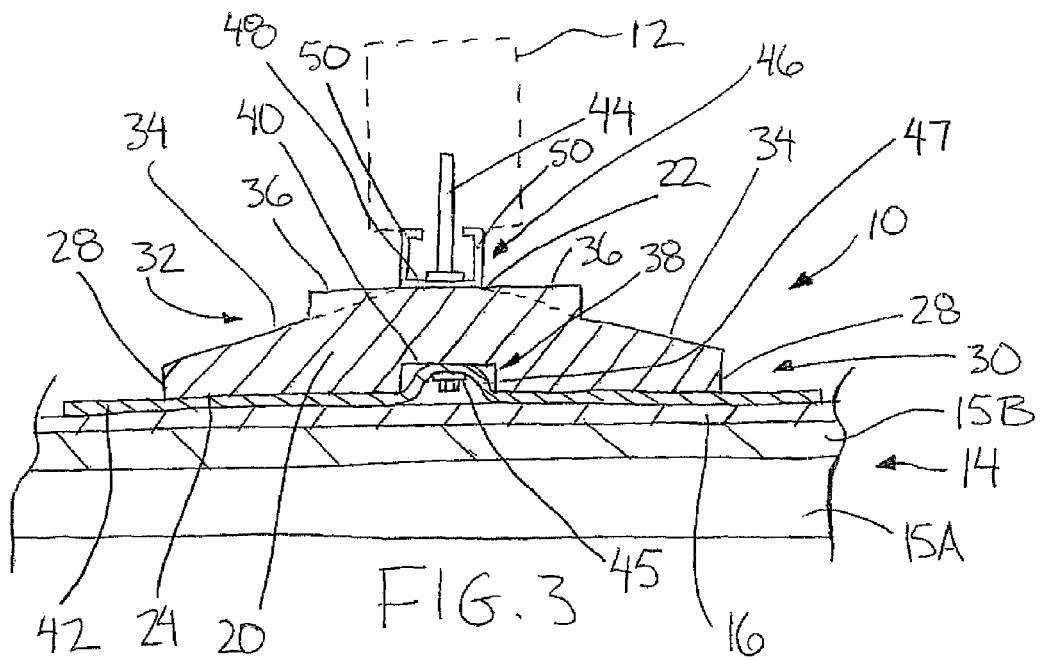
FIG. 3 is a sectional view along with line 3-3 of FIG. 2.

Referring to the accompanying figures there is illustrated a roof object support device generally indicated by reference numeral 10. The device 10 is particularly suited for supporting a roof object 12 on a roof 14 comprising a roof membrane 16 spanning the top side of the roof. More particularly, the roof comprises a roof structure of a building in which the roof includes a rigid supporting structure typically comprised of roof trusses 15A supporting sheathing 15B thereon upon which the roof member 16 is bonded, typically using a suitable adhesive. The roof membrane is typically formed of thermoplastic olefin (TPO), ethylene propylene diene monomer rubber (EPDM), polyvinyl chloride (PVC), or a modified bituminous material to provide weatherproofing to the rigid supporting structure of the roof.

The support device 10 permits the roof object 12 to be isolated from the roof by self-dampening elastomeric material therebetween while also permitting the roof object to be held down onto the roof without harming the integrity of the roof membrane regardless of whether the roof membrane comprises a rubber or plastic product. The roof objects which may be supported on the device 10 include various forms of service units, pipes and ductwork that snake along the rooftop, or roof walkway systems for example.

The support device 10 includes a mounting block 20 which comprises a solid core of elastomeric material, for example recycled tires, so that the finished block is resilient and self-dampening to dampen vibrations between the roof object and the roof membrane. The block 20 is unitary, integral and seamless in construction so as to be formed in like material throughout between a top side 22 and a bottom side 24 thereof.

The bottom side 24 is generally flat and square in shape having dimensions for example which may be 12 inches by 12 inches. The bottom side spans in a longitudinal direction between opposed ends 26 and in a lateral direction between opposing sides 28 such that the height and length correspond to at least three times a height between the top and bottom sides of the block. In the illustrated embodiment, the width in the lateral direction and the length in the longitudinal direction correspond to approximately 4 times the height of 3 inches between the top and bottom sides of the block.

The block 20 comprises a base portion 30 in which the two sides 28 and the two ends 26 of the block extend substantially vertically upward partway up the height of the block. The block further comprises a tapered upper portion 32 in which the two ends 26 remain vertical and continuous with the ends of base portion 30 while the sides 28 connect to two sloped walls 34 which extend upwardly and inwardly from the opposing sides 28 of the base portion towards one another to be joined at a upper portion defining the top side 22 of the block. The surface of the upper portion at the top side 22 of the block is horizontal in orientation and is elongate in the longitudinal direction of the block between ends 26 of the block. The upper portion at the top side 22 is centered in the lateral direction for connection between the two sloped walls 34 of the tapered upper portion 32.

The block 20 further comprises two auxiliary mounts 36 which are formed integrally with the remainder of the block. More particularly, each of the two auxiliary mounts 36 comprises a projection extending upward from the respective one of the two sloped walls 34 to be flush with the surface of the upper portion at the top side 22 at a location which is centered in the longitudinal direction while projecting laterally outward from opposing sides of the upper portion. Mounting apertures for receiving suitable fasteners extend vertically downward through the mounting block 20 at the location of the two auxiliary mounts 36 so that the resulting fasteners received therein are spaced apart in the lateral direction.

The mounting block 20 further comprises a recessed channel 38 formed in the bottom side of the block such that the channel is open to the bottom side and extends upwardly and inwardly therefrom to a top wall 40 of the channel which is horizontal in orientation and spaced part way between the top and bottom sides of the block. The channel 38 is elongate in the longitudinal direction to span substantially the full length of the block between the opposing ends 26 which are enclosed by respective end walls. The channel 38 is also centered in the lateral direction so as to be aligned directly below the upper surface forming the top side 22 of the block.

The support device 10 further comprises a mounting membrane or coupling sheet 42 which is mechanically fastened below the mounting block so as to fully span the bottom side of the mounting block. The mechanical coupling between the block and the coupling sheet defines a first mechanical connection of the roof object to the roof membrane.

The coupling sheet 42 comprises a thin flexible sheeted material spanning a greater dimension than the block in both the longitudinal direction and the lateral direction to project laterally and horizontally outwardly beyond the mounting block in all directions about the full perimeter thereof to define a peripheral portion 43 of the coupling sheet extending beyond the block.

Typically two fasteners 44 are provided for mechanically fastening the coupling sheet to the mounting block; however, more or fewer fasteners may be used as desired. Typically the fasteners each comprise a bolt with a bolt head which are mounted in respective through apertures in both the coupling sheet 42 and the block 20 so that the head of the bolt can engage a washer which in turn engages beneath the membrane 42 while an opposing top of the fasteners extends up beyond the top end of the block. Also a common clamping element 46 in the form of a clamping plate with mounting apertures therein can span both fasteners and receives the fasteners through the respective apertures in the plate. Accordingly, by tightening the fasteners the first mechanical connection involves frictionally clamping a central clamped portion of the coupling sheet 42 between the clamping element 45 and the bottom side of the block with which the coupling sheet is directly engaged.

The two fasteners are located in respective apertures in the block which are aligned with the recessed channel 38 at longitudinally opposed ends thereof so as to extend vertically upward therefrom in alignment with the top side 22 of the block. The fasteners 44 extend upwardly beyond the top side of the block to permit mounting of auxiliary brackets and the like thereto, for in turn fastening the roof object 12 to the mounting block 20 using the same fasteners which secure the coupling sheet mechanically to the block.

Locating the fasteners 44 in the recessed channel 38 permits the bolt heads at the bottom ends of the fasteners to be fully recessed into the block. Furthermore, locating the fastener heads to be near or substantially flush with the bottom side of the block minimizes the upward flexing of the coupling sheet 42 into the recessed channel in the mounted position of the membrane 42 coupled to the block 20. The full perimeter of the bottom side of the block about the recessed channel ensures that the coupling sheet 42 is held flat against the roof in the mounted position.

The recessed channel 38 causes the mechanically clamped portion of the coupling sheet 42 to be spaced upwardly from the surrounding bonded portion of the coupling sheet 42 which lays flat directly against the roof membrane to which it is bonded. The bonded portion of the coupling sheet 42 can include the portion spanning the bottom side of the block about the recessed channel 38, the peripheral portion 43, or both. The resulting slack portion 47 of the coupling sheet 42 which extends upward from the bonded portion to the clamped portion of the coupling sheet allows for some relative horizontal movement between the mounting block and the roof membrane to which the coupling sheet 42 is bonded while providing pull strength which resists upward movement of the block relative to the roof membrane to which the coupling sheet is bonded.

The support device 10 further comprises a mounting member 46 spanning in the longitudinal direction along the top side of the block. The mounting member 46 comprises a rigid metal channel which is generally U-shaped in cross section having a base 48 and two upstanding side flanges 50 along opposing sides of the base. The upper free edges of the two side flanges 50 are bent inwardly to form a hook formation for retaining additional mounting elements in relation to the block as may be desired. The mechanical connection or coupling of the roof object to the rigid mounting member 46 defines a second mechanical connection which preferably also includes clamping or threaded fasteners or both to secure the roof object to the mounting member 46.

The base 48 of the rigid metal channel forming the mounting member 46 further comprises a pair of apertures as longitudinally spaced positions therein for alignment with the fasteners 44 extending upwardly therethrough. Suitable nuts can be secured to the bolts above the base of the mounting member 46 so that the fasteners of the coupling sheet 42 also clamp the mounting member 46 onto the top side 42 of the block.

According to a first embodiment, use of the device 10 initially involves the coupling sheet being mechanically secured along the bottom side of the block. The mounting member is simultaneously secured along the top side of the block using the common fasteners extending through the block. The block is then mounted on the roof by adhesively securing the coupling sheet to the roof membrane of the roof. The block may be first positioned on the roof with the coupling sheet between the block and the roof membrane prior to application of adhesive or bonding by only bonding the peripheral portion of the coupling sheet to the roof membrane while the block remains in a mounted position. Once the block is secured to the roof membrane, the roof object is supported on the mounting block. The mounting member and fasteners of the device 10 permit the roof object to be fastened to the block so that the roof object is held down onto the roof with considerable force.

The device 10 is made commercially available with a plurality of different coupling sheets of different material such that a user selects the coupling sheet having the same material as the roof membrane or having the most compatible material for strong adhesive bonding to the roof membrane. More particularly, the material forming the sheet 42 is selected from many different materials available so that the membrane is compatible with the material forming the roof membrane 16 upon which the support device 10 is to be installed.

The coupling sheet 42 is thus typically formed of thermoplastic olefin (TPO), ethylene propylene diene monomer rubber (EPDM), polyvinyl chloride (PVC), or a modified bituminous material which is identical to the roof membrane to which the sheet is coupled. The coupling sheet is thus connected to the roof membrane using the same techniques used for bonding adjacent sheets of the roof membrane when installing the roof membrane. The bonding may be accomplished using appropriate adhesives in some instances or by fusing the sheet to the roof membrane in the instance of bituminous material for example.

When the materials of the roof membrane and the coupling sheet 42 of the device 10 are the same or are bond compatible, a strong adhesive bond can be formed therebetween to hold the membrane down to the roof and in turn hold down any roof object fastened to the mounting block 20. Typically the materials and bonding means are selected so that the bond strength exceeds the bond strength of the roof membrane to the rigid roof structure. For PVC, TPO and EPDM, the minimum bond strength when bonding like or compatible materials is 60 pounds per square foot for minimum grades of roof membrane. For Modified Bituminous material, the minimum bond strength when bonding like or compatible materials is 75 pounds per square foot for minimum grades of roof membrane. When using better grades of PVC, TPO, EPDM, or Modified Bituminous material for the coupling sheet the bond strength when using bond compatible coupling sheets and roof membranes exceeds 225, 600, 120 and 210 pounds per square foot respectively when the bond strength of the PVC, TPO, EPDM, or Modified Bituminous roof membrane to the roof structure is 225, 600, 120, and 210 pounds per square foot respectively.

Depending upon the upward lift force desired to be resisted, a user selects an appropriately size coupling sheet so that the overall bonded area and pounds per square foot bond strength provide the necessary resistance force. The area of the coupling sheet typically ranges from 3 to 10 square feet.

Figure 4:
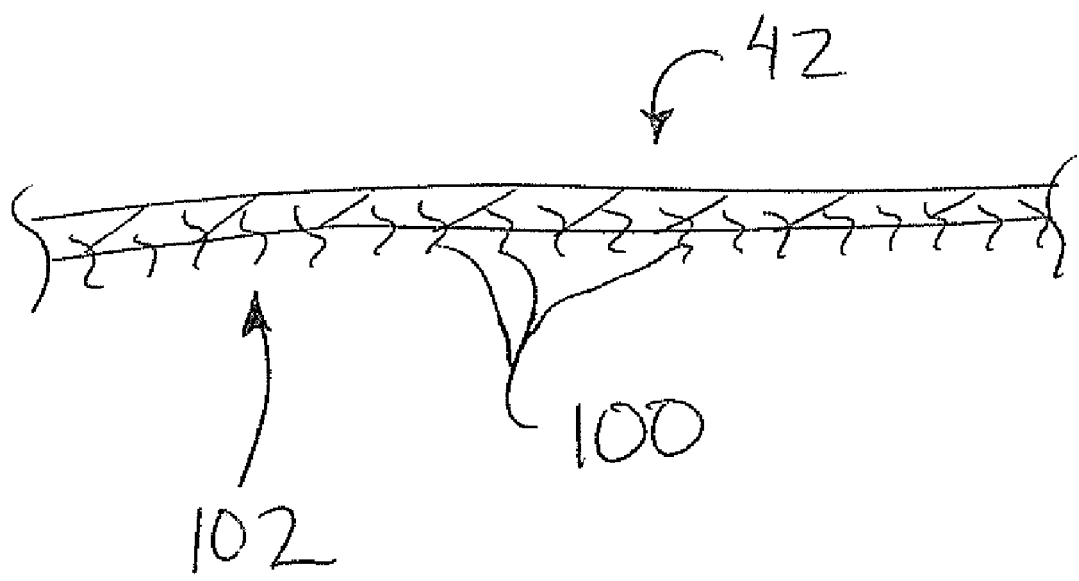
FIG. 4 is a cross sectional view of an alternative embodiment of the coupling sheet.

In a further embodiment shown in FIG. 4, a single coupling sheet 42 is provided for bonding to all roof membrane types. In this instance the coupling sheet includes fleece fibres 100 which are integrally molded into the material of the coupling sheet. The fibres 100 are exposed on a lower bonding surface 102 of the coupling sheet 42. The coupling sheet is mechanically fastened to the block 10 as described above but suitable adhesive is used to bond the fleece fibres of the lower bonding surface to the roof membrane regardless of the type of roof membrane provided by matching the adhesive to be compatible with the roof membrane type.

In some applications, the sheet 42 doesn't serve to couple the block to the roof membrane, but instead only acts as a gasket between the block and the roof membrane to prevent the roof membrane from suffering any wear damage. Accordingly, no bonding is required, but the sheet 42 typically spans the bottom of the block and beyond as noted above to prevent contact of the block with the roof membrane. The mechanical connection between the sheet 42 and the block remains identical to ensure the block remains in position on top of the sheet and not the roof membrane. In this instance, the sheet 42 is again typically formed of the same material as the roof membrane to ensure that the sheet 42 has the same or less hardness as compared to the roof membrane so that the device 10 won't damage the roof membrane regardless of the differing material of the block. Furthermore, arranging the coupling sheet to have an equal or lesser coefficient of friction than the roof membrane further minimizes wear of the roof membrane when the sheet lies between the bottom side of the block and the roof membrane.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of supporting a roof object on a roof of a building comprising a rigid supporting structure and a roof membrane bonded to an upper surface of the rigid supporting structure so as to be arranged for weatherproofing the supporting structure, the method comprising:

providing a support device comprising a mounting block formed of a resilient material which differs from the roof membrane and a coupling sheet formed of a resilient material which is arranged to be bonded to the roof membrane in which the mounting block is coupled to the coupling sheet using a first mechanical connection;

bonding the coupling sheet to the roof membrane such that the coupling sheet is the only connection between the support device and the roof of the building and such that the first mechanical connection does not penetrate the roof membrane;

wherein the first mechanical connection comprises a rigid fastener clamping a portion of the resilient material of the coupling sheet to the resilient material of the mounting block at a location spaced above a bottom side of the mounting block such that the rigid fastener does not contact the roof membrane; and coupling the roof object above the mounting block using a second mechanical connection.

2. The method according to claim 1 wherein the roof membrane is selected from the group including thermoplastic olefin, ethylene propylene diene monomer rubber, polyvinyl chloride, and modified bituminous and the coupling sheet is formed of a material which is bond compatible with the roof membrane and wherein the method further includes bonding the coupling sheet to the roof membrane such that a bond between the coupling sheet and the roof membrane has a bond strength which exceeds 60 pounds per square foot.

3. The method according to claim 2 including bonding the coupling sheet to the roof membrane such that a bond between the coupling sheet and the roof membrane has a bond strength which exceeds 225 pounds per square foot.

4. The method according to claim 1 wherein the coupling sheet includes a peripheral portion which projects laterally outwardly beyond the mounting block about a full perimeter of the mounting block.

5. The method according to claim 4 including bonding the peripheral portion of the coupling sheet to the roof membrane subsequent to supporting the mounting block on the roof membrane.

6. The method according to claim 1 including bonding a bonding portion of the coupling sheet to the roof membrane at a location spaced from the mechanical connection between the coupling sheet and the mounting block.

7. The method according to claim 1 wherein the rigid fastener of the first mechanical connection includes a threaded fastener extending through the coupling sheet and through a portion of the mounting block.

8. The method according to claim 1 wherein the portion of the coupling sheet clamped by the rigid fastener is clamped in engagement against a bottom side of the mounting block.

9. The method according to claim 1 wherein the mounting block includes a recessed portion in a bottom side of the mounting block and the first mechanical connection is located in the recessed portion such that the portion of the coupling sheet which is clamped to the mounting block is space upwardly from a bonding portion of the coupling sheet which is bonded to the roof membrane.

10. The method according to claim 1 wherein the mounting block comprises a vibration damping material, and wherein the support device includes a rigid mounting member clamped to the mounting block, the second mechanical connection comprising the roof object being mechanically connected to the rigid mounting member.

11. The method according to claim 10 wherein the rigid fastener of the first mechanical connection also couples the rigid mounting member to the mounting block.

12. The method according to claim 1 wherein the coupling sheet comprises a membrane having integral fleece fibres which are exposed on a lower bonding surface and wherein the method includes bonding the fleece fibres of the lower bonding surface to the roof membrane.

13. A method of supporting a roof object on a roof of a building comprising a rigid supporting structure and a roof membrane spanning an upper surface of the rigid supporting structure so as to be arranged for weatherproofing the supporting structure, the method comprising:

providing a support device comprising a mounting block formed of a resilient material which differs from the roof membrane, a sheet formed of a resilient material which differs from the mounting block, and a mechanical connection connecting the sheet to the mounting block;

supporting the mounting block on the roof membrane such that:

the sheet fully spans a bottom side of the mounting block;

the sheet is the only portion of the support device in contact with the roof; and the mechanical connection does not penetrate the roof membrane;

wherein the mechanical connection comprises a rigid fastener clamping a portion of the resilient material of the sheet to the resilient material of the mounting block at a location spaced above a bottom side of the mounting block such that the rigid fastener does not contact the roof membrane; and supporting the roof object on the mounting block.

14. The method according to claim 13 wherein the roof membrane is selected from the group including thermoplastic olefin, ethylene propylene diene monomer rubber, polyvinyl chloride, and modified bituminous and the sheet is formed of a material having the same or less hardness than the roof membrane.

15. The method according to claim 13 wherein the roof membrane is selected from the group including thermoplastic olefin, ethylene propylene diene monomer rubber, polyvinyl chloride, and modified bituminous and wherein the sheet is formed of a material which is identical to the roof membrane.

16. The method according to claim 13 wherein the rigid fastener of the mechanical connection includes a threaded fastener extending through the sheet and through a portion of the mounting block such that the portion of the sheet clamped by the rigid fastener is clamped in engagement against a bottom side of the mounting block.

17. A method of supporting a roof object on a roof of a building comprising a rigid supporting structure and a roof membrane spanning an upper surface of the rigid supporting structure so as to be arranged for weatherproofing the supporting structure, the method comprising:

providing a support device comprising a mounting block formed of a material which differs from the roof membrane and which includes a recessed portion formed in a bottom side thereof and a sheet formed of a material which differs from the mounting block and which includes a clamped portion and a surrounding portion wherein:

the clamped portion of the sheet is connected to the mounting block using a mechanical connection which clamps the clamped portion of the sheet in fixed relation to the mounting block; and the mechanical connection between the clamped portion of the sheet and the mounting block is located in the recessed portion;

supporting the mounting block on the roof membrane such that the sheet substantially spans a bottom side of the mounting block between the mounting block and the roof membrane and such that the clamped portion of the sheet which is mechanically coupled to the mounting block is spaced upwardly from the surrounding portion of the sheet which substantially spans the bottom side of the mounting block between the mounting block and the roof membrane; and supporting the roof object on the mounting block.

18. The method according to claim 13 including positioning a peripheral portion of the sheet to project laterally outwardly beyond the mounting block about a full perimeter of the mounting block.

19. A method of supporting a roof object on a roof of a building comprising a rigid supporting structure and a roof membrane bonded to an upper surface of the rigid supporting structure so as to be arranged for weatherproofing the supporting structure, the method comprising:

providing a support device comprising:

a mounting block formed of a material which differs from the roof membrane;

a coupling sheet formed of a material which is arranged to be bonded to the roof membrane a first mechanical connection comprising threaded fasteners clamping a portion of the coupling sheet to the mounting block; and a rigid mounting member clamped to a top side of the mounting block using the threaded fasteners of the first mechanical connection;

bonding a bonding portion of the coupling sheet to the roof membrane such that the coupling sheet is the only connection between the support device and the roof of the building and such that the first mechanical connection does not penetrate the roof membrane; and coupling the roof object above the mounting block using a second mechanical connection.

* * * * *